(12) United States Patent
Sakurai

(10) Patent No.: US 8,848,281 B2
(45) Date of Patent: Sep. 30, 2014

(54) WAVELENGTH CONVERSION APPARATUS, LIGHT SOURCE APPARATUS, AND WAVELENGTH CONVERSION METHOD

(71) Applicant: Advantest Corporation, Tokyo (JP)

(72) Inventor: Takao Sakurai, Tokyo (JP)

(73) Assignee: Advantest Corporation, Tokyo (JP)

( * ) Notice: Subject to any disclaimer, the term of this patent is extended or adjusted under 35 U.S.C. 154(b) by 1 day.

(21) Appl. No.: 13/739,007

(22) Filed: Jan. 11, 2013

(65) Prior Publication Data

US 2013/0202245 A1    Aug. 8, 2013

(30) Foreign Application Priority Data

Feb. 8, 2012  (JP) .................... 2012-024823

(51) Int. Cl.
| | |
|---|---|
| *G02F 1/35* | (2006.01) |
| *H01S 3/10* | (2006.01) |
| *G02F 1/355* | (2006.01) |
| *G02F 1/377* | (2006.01) |
| *G02F 1/335* | (2006.01) |
| *G02F 1/33* | (2006.01) |

(52) U.S. Cl.
CPC .............. *G02F 1/335* (2013.01); *G02F 1/3558* (2013.01); *G02F 1/33* (2013.01); *G02F 2001/3548* (2013.01); *G02F 2001/3546* (2013.01); *G02F 2203/24* (2013.01); *G02F 1/3534* (2013.01); *G02F 2203/05* (2013.01); *G02F 2203/58* (2013.01); *G02F 1/3775* (2013.01)
USPC ............... 359/326; 359/328; 372/21

(58) Field of Classification Search
USPC ......................... 359/326, 328, 329
See application file for complete search history.

(56) References Cited

U.S. PATENT DOCUMENTS

| | | | |
|---|---|---|---|
| 2008/0186710 A1 | 8/2008 | Kumagai et al. | |
| 2008/0219302 A1* | 9/2008 | Nakayama et al. | ............. 372/21 |
| 2010/0150185 A1* | 6/2010 | Gollier et al. | .................. 372/20 |
| 2010/0220384 A1* | 9/2010 | Kimura et al. | ................ 359/328 |
| 2011/0103413 A1* | 5/2011 | Kafka et al. | .................... 372/22 |

FOREIGN PATENT DOCUMENTS

| | | |
|---|---|---|
| CN | 101101428 A | 1/2008 |
| JP | H06-160926 A | 6/1994 |
| JP | 2005-504360 A | 2/2005 |

OTHER PUBLICATIONS

Database WPI; Week 200828; Thompson Scientific, London, GB; AN 2008-D87199 XP002695357,—& CN 101 101 428 A (CAS Shanghai Inst Optics&Fine Mechanic) Jan. 9, 2008.

(Continued)

*Primary Examiner* — Hemang Sanghavi

(57) ABSTRACT

In order to create a stable non-linear optical effect with high efficiency for a plurality of input lights having different wavelengths, according to a first aspect of the present invention, provided is a wavelength conversion apparatus comprising an input section into which input light is input; a wavelength converting section that includes a polarity inverting structure whose polarity inverts periodically and that, in response to the input of light having a wavelength corresponding to the period with which the polarity inverts, converts the wavelength of the light; and a direction changing section that changes a progression direction in which the input light passes through the polarity inverting structure, according to the wavelength of the input light, without changing relative positions of the input section and the polarity inverting structure. Also provided are a light source apparatus and a wavelength converting method.

20 Claims, 5 Drawing Sheets

(56) References Cited

OTHER PUBLICATIONS

Zhao, PU et al; "Tunable dual-signal PPLN optical parametric generator by using an acousto-optic beam splitter"; Journal of Optics A: Pure and Applied Optics; 2007, pp. 235-238.

European Search Report for application No. EP 12 19 6585.

Fejer, Martin M. et al, "Quasi-Phase-Matched Second Harmonic Generation Tuning and Tolerance," IEEE Journal of Quantum Electronics, vol. 28, No. 11, 1992, pp. 2631-2654.

* cited by examiner

US 8,848,281 B2

WAVELENGTH CONVERSION APPARATUS, LIGHT SOURCE APPARATUS, AND WAVELENGTH CONVERSION METHOD

BACKGROUND

1. Technical Field

The present invention relates to a wavelength conversion apparatus, a light source apparatus, and a wavelength converting method.

2. Related Art

A conventional wavelength converting element is known that converts the wavelength of input light using quasi-phase matching and outputs the converted light. Such a wavelength converting element includes a polarity inverting structure with a period corresponding to the used wavelength within a crystal, inputs light perpendicular to a direction in which the polarity of the polarity inverting structure inverts, and realizes a non-linear optical effect such as generating a second harmonic, as shown in Patent Document 1, for example.

Patent Document 1: Japanese Translation of PCT International Patent Application No. 2005-504360

Non-Patent Document 1: Martin M. Fejer, et al., "Quasi-Phase-Matched Second Harmonic Generation Tuning and Tolerance", IEEE Journal of Quantum Electronics, Vol. 28, No. 11, 1992, pp. 2631-2654

In this wavelength converting element, however, the polarity inversion period of the polarity inverting structure is designed to correspond to a specific wavelength of input light, and therefore it is difficult to reliably and efficiently create the non-linear optical effect for a plurality of input lights with wavelengths differing from the specific wavelength.

SUMMARY

Therefore, it is an object of an aspect of the innovations herein to provide a wavelength conversion apparatus, a light source apparatus, and a wavelength conversion method, which are capable of overcoming the above drawbacks accompanying the related art. The above and other objects can be achieved by combinations described in the claims. According to a first aspect of the innovations of the present invention, provided is a wavelength conversion apparatus comprising an input section into which input light is input; a wavelength converting section that includes a polarity inverting structure whose polarity inverts periodically and that, in response to the input of light having a wavelength corresponding to the period with which the polarity inverts, converts the wavelength of the light; and a direction changing section that changes a progression direction in which the input light passes through the polarity inverting structure, according to the wavelength of the input light, without changing relative positions of the input section and the polarity inverting structure. Also provided are a light source apparatus and a wavelength converting method.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
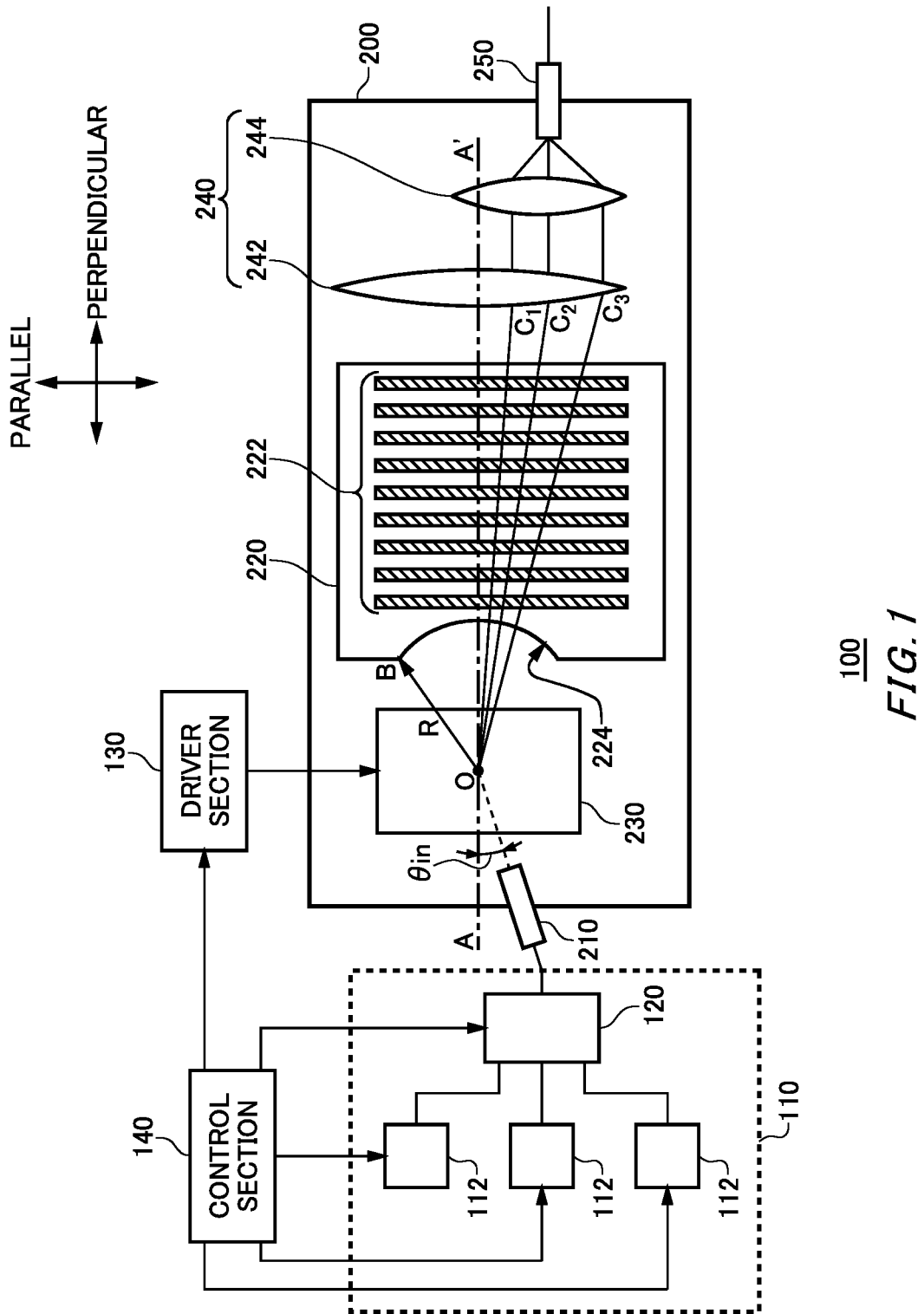
FIG. 1 shows an exemplary configuration of a light source apparatus 100 according to an embodiment of the present invention.

FIG. 1 shows an exemplary configuration of a light source apparatus 100 according to an embodiment of the present invention. The light source apparatus 100 includes a plurality of light sources therein that each output light of a different wavelength. The light source apparatus 100 converts the wavelength of the light output from each light source, and outputs the resulting light. The light source apparatus 100 includes a light source section 110, a driver section 130, a control section 140, and a wavelength conversion apparatus 200.

The light source section 110 outputs light with a plurality of wavelengths. In the present embodiment, the light source section 110 selects the light wavelength output from one designated light source among the plurality of light sources, and outputs this light. Instead, the light source section 110 may use a variable wavelength light source. The light source section 110 includes the plurality of light sources 112 and a light source selecting section 120.

Each light source 112 outputs light of a different wavelength. The light sources 112 may be laser light sources. The light sources 112 may be light sources with optical fiber output. For example, the light sources 112 may be laser light sources that respectively output light having a wavelength of 1064 nm, 1080 nm, and 1120 nm.

The light source selecting section 120 includes one or more optical switches, selects one designated light source from among the plurality of light sources 112, and allows the selected light source to output light. If the light source section 110 includes n light sources 112, the light source selecting section 120 may include a single n-input/1-output switch, or an n-input/1-output switch may be formed by combining a plurality of switches that each have n or less inputs. If the light sources 112 use optical fiber output, the optical switches preferably use optical fiber input and optical fiber output.

The driver section 130 supplies the wavelength conversion apparatus 200 with a modulated signal having a frequency $f_s$. The driver section 130 includes therein an oscillator, an amplifier, and a frequency control circuit that controls the oscillation frequency of the oscillator. The driver section 130 outputs a modulated signal with a designated frequency. The driver section 130 may output a modulated signal with a frequency reaching several GHz.

The control section 140 designates the light source 112 that is to output light in the light source section 110. The control section 140 designates, in the driver section 130, a predetermined frequency $f_s$ corresponding to the designated light source 112. The control section 140 includes a storage section, and may record the predetermined frequency $f_s$ designated for the driver section 130 for each of the light sources 112.

The wavelength conversion apparatus 200 performs wavelength conversion on each input light having a different wavelength. The wavelength conversion apparatus 200 includes an input section 210, a wavelength converting section 220, a direction changing section 230, a lens section 240, and an output section 250.

The input section 210 inputs the input light. The input section 210 includes an optical lens, collimates the input light, and emits the collimated light. The input section 210 may be a fiber collimator that receives the input light with optical fiber. Instead, the input section 210 may be formed by an optical system obtained by combining optical lenses, for example.

The wavelength converting section 220 includes a polarity inverting structure 222 having polarity that inverts periodically, and converts the wavelength of light in response to the input of light having a wavelength corresponding to the period with which the polarity inverts. The wavelength converting section 220 outputs light with a wavelength that is ½ the wavelength of the input light. The wavelength converting section 220 may output light with a frequency equal to the sum of the frequencies of two input lights or the difference between the frequencies of two input lights. The wavelength converting section 220 includes an anti-reflection film that prevents reflection of the input and output light, formed on at least a portion of a surface through which light is input and output.

When light with a high-intensity electric field, such as laser light, is input to a non-linear optical crystal, for example, a non-linear optical effect such as a second harmonic component of the input light occurs according to the photoelectric field strength. In this example, the generated second harmonic component is increased and decreased by repeating generation and attenuation with a period having a length that is twice the coherence length. Therefore, by forming the polarity inverting structure 222 such that the polarity inversion period thereof substantially matches the period of increase and decrease, the wavelength converting section 220 can efficiently output the generated second harmonic component while lowering the loss caused by attenuation. This type of wavelength conversion is referred to as "quasi-phase matching" (QPM).

The wavelength converting section 220 may include a wavelength converting element formed by a crystal such as periodical poled lithium niobate (PPLN), periodical poled lithium tantalite (PPLT), KTP, or BBO. The polarity inverting structure 222 may be formed by growing this crystal while applying an external electrical field to a non-linear optical crystal such as a ferroelectric crystal in order to periodically invert the polarity of the polarity inverting structure 222.

The direction changing section 230 changes a progression direction in which the input light passes through the polarity inverting structure 222, according to the wavelength of the input light, without changing the relative positions of the input section 210 and the polarity inverting structure 222. In the present embodiment, the direction changing section 230 changes the incident angle at which the input light is input to the polarity inverting structure 222, according to the wavelength of the input light, and sets the period at which the polarity of the polarity inverting structure 222 inverts in the progression direction of the input light to be the period at which the wavelength of the input light corresponding to this incident angle is converted.

In the present embodiment, the direction changing section 230 includes an acousto-optic element that changes the progression direction of the input light by using an acousto-optic effect. Here, the acousto-optic element forms a diffraction grating with an ultrasonic wave frequency when an ultrasonic wave is supplied to the crystal forming the element to cause oscillation. Due to the oscillation by the supplied ultrasonic wave, this crystal experiences periodic stress therein that causes periodic increases and decreases in the refractive index, thereby forming a refractive index grating. The direction changing section 230 can change the progression direction, which is the diffraction direction of the input light, according to the frequency of the supplied ultrasonic wave, by including the acousto-optic element described above.

In the example of FIG. 1, the direction changing section 230 changes the progression direction of the input light to be $O\text{-}C_1$, $O\text{-}C_2$, or $O\text{-}C_3$, for example, according to the wavelength of the input light from the input section 210 having an incident angle of $\theta_{in}$ relative to the incident direction A-O that is perpendicular to the direction changing section 230. In this way, the direction changing section 230 may change the diffraction direction centered on the point O near the center of the grating formed by the ultrasonic wave. With $\lambda$ representing the wavelength of the input light, $\theta_d$ representing the diffraction angle, and $v$ representing the sound velocity within the crystal, the relationship between the incident angle $\theta_{in}$ and the diffraction angle $\theta_d$ can be expressed as shown in the following Expression.

$$\theta d = \frac{\lambda \cdot f_s}{v} - \theta in \qquad \text{Expression 1}$$

The direction changing section 230 includes a crystal having an acousto-optic effect, such as lead molybdate or tellurium dioxide. The direction changing section 230 may include, on the end surface of the crystal, a transducer or the like that converts the frequency signal supplied thereto into an acoustic wave. The direction changing section 230 performs Bragg diffraction on the input light using the diffraction grating formed according to the acoustic wave, and outputs the diffracted light in the diffraction direction O-C corresponding to the supplied frequency.

The lens section 240 receives the light output from the wavelength converting section 220 that has been wavelength-converted, and converts this light to collimated light or focuses the light at a predetermined focal position. For example, when the wavelength conversion apparatus 200 uses optical fiber output for the output light, the lens section 240 may include an optical system that focuses the light in an optical system such as an optical fiber. As another example, the lens section 240 may include a light receiving lens 242 that receives and collimates the light output from the wavelength converting section 220 that has been wavelength-converted, and a converging lens 244 that focuses the collimated light at an optical system such as fiber.

Instead, the lens section 240 may include a converging lens 244 that directly receives the light output from the wavelength converting section 220 and focuses this light at an optical system such as fiber. When the output light of the wavelength conversion apparatus 200 is to be output as collimated light, for example, the lens section 240 may include a light receiving lens 242 that receives and collimates the light output from the wavelength converting section 220 that has been wavelength-converted. FIG. 1 is used to describe an example in which the lens section 240 focuses light at an optical system such as optical fiber.

When the direction changing section 230 changes the progression direction of the input light to be the direction O-$C_1$, O-$C_2$, or O-$C_3$, for example, with the point O as the origin, the light receiving lens 242 of the lens section 240 may set the focal point distance to be substantially the same as the distance from the light receiving lens 242 to the point O. In this case, the light receiving lens 242 preferably uses a focal point distance takes into account the refractive indices of the wavelength converting section 220 and the direction changing section 230. In this way, the light receiving lens 242 can receive converted light output from the wavelength converting section 220 in a variety of directions with the point O as the origin, and convert this light into collimated light.

The output section 250 receives the light focused by the lens section 240, and outputs this light to the outside of the wavelength conversion apparatus 200. The output section 250 includes an optical lens, and may be a fiber collimator that outputs light to an optical fiber. Instead, the output section 250 may be an optical system formed by combining a plurality of optical lenses. As another example, the lens section 240 may have the function of the output section 250, in which case the output section 250 may be omitted.

The wavelength conversion apparatus 200 described above changes the optical path taken through the polarity inverting structure 222 for each of the light sources 112, and efficiently outputs the second harmonic of light output by each light source 112 while using a single wavelength converting section 220. For example, when the wavelength converting section 220 includes the polarity inverting structure 222 with a period of $2l_C$ and quasi-phase matching is performed for input light with a wavelength of $\lambda_0$, the direction changing section 230 causes the input light to be incident to the wavelength converting section 220 with an incident angle of substantially 0 degrees.

In other words, the control section 140 instructs the driver section 130 to generate a frequency corresponding to the wavelength $\lambda_0$. The direction changing section 230 receives this frequency signal from the driver section 130, thereby forming a diffraction grating that causes the diffraction direction of the input light to be perpendicular to the polarity inverting structure 222.

In this way, the polarity inverting structure 222 can efficiently generate the second harmonic with a wavelength of $\lambda_0/2$. When light whose wavelength is shifted from $\lambda_0$ is input with an incident angle of 0 degrees, the polarity inverting structure 222 decreases the effect of the quasi-phase matching according to the wavelength shift amount, and decreases the efficiency of the conversion to the second harmonic. More specifically, with $\Delta\lambda$ representing the wavelength conversion bandwidth at which the conversion efficiency of the input wavelength $\lambda_0$ is ½, the input wavelength $\lambda_0$ and $\Delta\lambda$ have the relationship shown in the following Expression.

$$2\Delta\lambda = \frac{0.44 \cdot \lambda_2}{(n_2 - n_1) \cdot L} \quad \text{Expression 2}$$

Here, $n_1$ represents the refractive index with respect to the fundamental wave (light with wavelength $\lambda_0$) of the polarity inverting structure 222, and $n_2$ represents the refractive index with respect to the second harmonic of the polarity inverting structure 222. Based on the above Expression, in a case where the polarity inverting structure 222 with an element length L=20 mm has the most efficient polarity inversion period $2l_c$ quasi-phase matching the input light when light with a wavelength $\lambda_0$=1168 nm is input with an incident angle of 0 degrees, the $\Delta\lambda$ at which the conversion efficiency is ½ is calculated to be approximately 0.21 nm. In other words, the polarity inverting structure 222 reduces the efficiency of the conversion to the second harmonic to ½ when input light with a wavelength of 1168.21 nm is input at an incident angle of 0 degrees.

Accordingly, even when the output from light sources having different wavelengths is incident to the polarity inverting structure 222 with the same incident angle, the polarity inverting structure 222 cannot efficiently generate the second harmonics for input light that is outside of a bandwidth limited to be no more than a predetermined 0.5 nm. The direction changing section 230 of the present modification changes the incident angle of the input light relative to the polarity inverting structure 222, according to the wavelength of the input light. In other words, the direction changing section 230 changes the incident angle of the input light such that the progression direction of the input light is inclined relative to the polarity inverting structure 222.

The polarity inverting structure 222 has a polarity inversion period for converting the wavelength of each a plurality of input lights in response to the direction changing section 230 changing the direction of each input light to have a progression direction with an incident angle that is not perpendicular to the polarity inverting structure 222. In other words, for a polarity inversion period that quasi-phase matches the input light with a wavelength of $\lambda 0$ and an incident angle of 0 degrees, when light with a wavelength $\lambda n$ that is longer than the wavelength $\lambda 0$ is input, the direction changing section 230 changes the incident angle of the input light according to the wavelength $\lambda n$.

For example, by changing the incident angle of the input light input to the polarity inverting structure 222 having a polarity inversion period $2lc$ from 0 degrees to $\theta$ degrees, the direction changing section 230 can lengthen the polarity inversion period with respect to input light progressing at an angle to be greater than or equal to $2lc/\cos \theta$, which is greater than or equal to $2lc$. In this way, by having the direction changing section 230 change the incident angle of the input light relative to the polarity inverting structure 222, a single polarity inverting structure 222 can change the wavelength that quasi-phase matches the input light. For example, the polarity inverting structure 222 that quasi-phase matches the input light with a wavelength $\lambda 0$ that is incident in a perpendicular direction, i.e. that has an incident angle of 0 degrees, the wavelength that quasi-phase matches the incident angle $\theta$ of the input light is expressed as shown below.

$$\lambda pm(\theta) = \lambda_0 + \frac{n_1}{2n_2} lc(\lambda_0) \left[\frac{\partial lc}{\partial \lambda}\right]^{-1} \theta^2 \quad \text{Expression 3}$$

Here, the coherence length lc is expressed as shown below.

$$lc = \frac{\lambda}{4(n_2 - n_1)} \quad \text{Expression 4}$$

Figure 2:
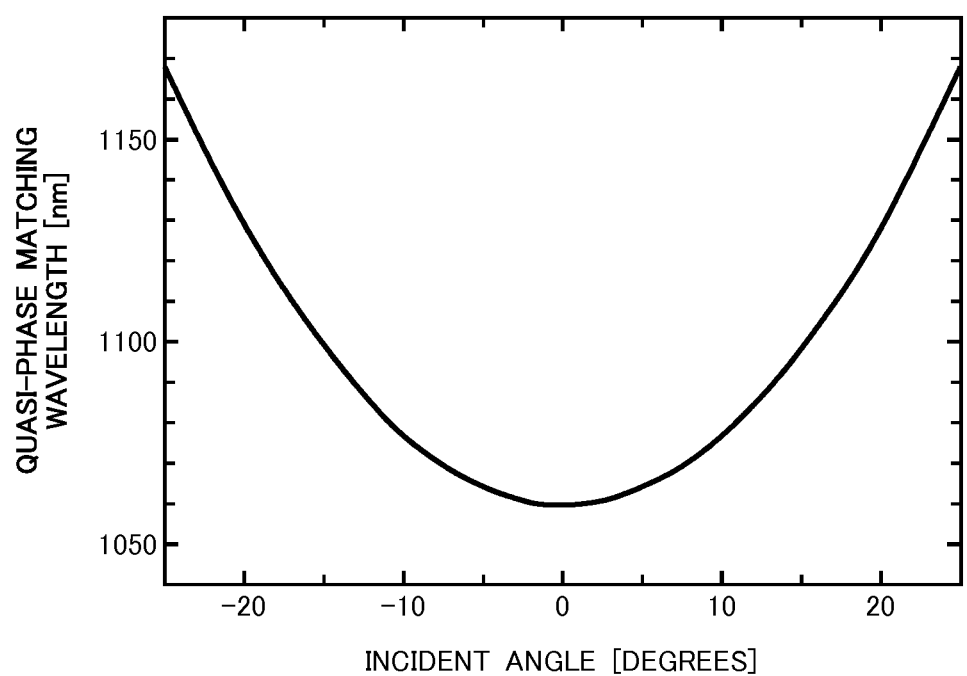
FIG. 2 shows an exemplary relationship between the quasi-phase matching wavelength and the incident angle to the polarity inverting structure 222 of the wavelength converting section 220 according to the present embodiment.

FIG. 2 shows an exemplary relationship between the quasi-phase matching wavelength and the incident angle to the polarity inverting structure 222 of the wavelength converting section 220 according to the present embodiment. FIG. 2 shows an example of wavelengths quasi-phase matching, for an incident angle θ of the input light, a polarity inverting structure 222 that quasi-phase matches input light with a wavelength of λ0=1060 nm in a perpendicular direction, i.e. an incident angle of 0 degrees. In FIG. 2, the horizontal axis represents the incident angle, and the vertical axis represents the quasi-phase matching wavelength. Based on the example of FIG. 2, it is understood that the quasi-phase matching wavelength for the polarity inverting structure 222 is changed by at least tens of nm as a result of the direction changing section 230 changing the incident angle by approximately 20 degrees.

For example, according to calculations, by having the direction changing section 230 change the incident angle by 5 degrees for input light with a wavelength of 1064 nm, the wavelength converting section 220 having the polarity inverting structure 222 with the characteristics shown in FIG. 2 can quasi-phase match the input light, and output light with a wavelength of 532 nm, which is a second harmonic. In the same manner, the wavelength converting section 220 can output light with a wavelength of 540 nm by changing the incident angle for input light with a wavelength of 1080 nm by 11.4 degrees, and can output light with a wavelength of 560 nm by changing the incident angle for input light with a wavelength of 1120 nm by 19.7 degrees.

Here, two values (positive and negative) are obtained for the incident angle. When the progression direction such as the direction O-C1, O-C2, or O-C3 is set to be in the negative direction from the incident angle, for example, the progression direction at a position symmetrical over a line A-A' with respect to the progression direction is the positive direction, and the direction changing section 230 may change the input light to be either of these directions.

Based on the above, the control section 140 designates a single light source 112 and designates a frequency to form a corresponding diffraction grating in the driver section 130, such that the direction changing section 230 changes the light output by this light source 112 to have a progression direction that quasi-phase matches the wavelength converting section 220. For example, the control section 140 may designate the light source 112 in the light source section that outputs light with a wavelength of 1064 nm, and designate in the driver section 130 a frequency that causes the direction changing section 230 to form a diffraction grating changing the incident angle with respect to the wavelength converting section 220 to be 5 degrees.

When lead molybdate is used as the direction changing section 230, the sound velocity v becomes approximately 3630 m/s. Therefore, when the wavelength of the input light is 1064 nm, the incident angle is 10 degrees, and the diffraction angle is −5 degrees, the frequency can be calculated to be substantially 893 MHz based on Expression 1. Therefore, the direction changing section 230 can change the direction of the input light to be the progression direction resulting in quasi-phase matching, by applying the calculated frequency. In the same manner, a frequency $f_s$ of substantially 1.25 GHz is calculated when the wavelength of the input light is 1080 nm, the incident angle is 10 degrees, and the diffraction angle is −11.4 degrees, and a frequency $f_s$ of substantially 1.68 GHz is calculated when the wavelength of the input light is 1120 nm, the incident angle is 10 degrees, and the diffraction angle is −19.7 degrees.

With the light source apparatus 100 according to the present embodiment described above, a non-linear optical effect can be created safely and with high efficiency for each of a plurality of input lights having wavelengths differing from each other by tens of nanometers or more. In this way, the light source apparatus 100 can use light sources 112 with wavelengths such as 1064 nm, 1080 nm, and 1120 nm that are easy to achieve with laser oscillation, and output light with wavelengths such as 532 nm, 540 nm, and 560 nm that are difficult to achieve with laser oscillation.

The light source apparatus 100 can create the non-linear optical effect without changing the relative positions of the input section 210 and the polarity inverting structure 222, and can therefore form an optical system without using movable components. In other words, the light source apparatus 100 can easily perform optical adjustment, can form an optical system with having good stability with respect to vibration and shock, and has improved reliability.

Furthermore, since the quasi-phase matching wavelength is expressed by a second order function of the incident angle θ, the polarity inverting structure 222 causes the change in the quasi-phase matching wavelength to be steeper when the incident angle is further from 0 degrees. Therefore, the polarity inverting structure 222 may include a polarity inversion period for converting the wavelengths of a plurality of input lights, in response to the direction changing section 230 changing the incident angle of each light with respect to the polarity inverting structure 222 to be an angle other than 0 degrees.

More preferably, the polarity inverting structure 222 may include a polarity inversion period for converting the wavelengths of a plurality of input lights, in response to the direction changing section 230 changing the incident angle of each light with respect to the polarity inverting structure 222 to be a larger angle. In other words, in the polarity inverting structure 222, the polarity inversion period for converting the wavelength of input light is formed by the direction changing section 230 changing the direction of each of a plurality of input lights from a perpendicular direction to an incident angle that is further from the perpendicular direction.

In this way, the polarity inverting structure 222 can achieve quasi-phase matching with a plurality of input lights in a region where the rate of change of the quasi-phase matching wavelength is higher with respect to the rate of change of the incident angle. In other words, the direction changing section 230 can decrease the range of the angle to be set for the progression direction, for each of a plurality of input lights having different wavelengths, thereby improving the design freedom of the optical system. For example, the polarity inverting structure 222 can be designed such that, for the input light having the longest wavelength among the plurality of input lights with different wavelengths, the polarity inversion period causes the angle to be set by the direction changing section 230 to be the largest incident angle allowed by the size of the polarity inverting structure 222.

In this way, when switching from input light with the largest wavelength to input light with the smallest wavelength, the direction changing section 230 can cause the input light resulting from a minimal change of the incident angle to quasi-phase match the polarity inverting structure 222. In other words, by designing the polarity inversion period in this way, the direction changing section 230 can achieve quasi-phase matching between the polarity inverting structure 222 and input light using a smaller amount of change in the incident angle for each of the plurality of input lights.

In the light source apparatus 100 of the present embodiment described above, the wavelength converting section 220 may further include an indented portion 224 formed in the surface to which the light is input. The indented portion 224 is formed as a recess whose cross section is a portion of a circle or ellipse. For example, the wavelength converting section 220 may include the indented portion 224 such that a distance OB, which is from the point O at which the direction changing section 230 changes the direction of the input light to the point at which the input light reaches the wavelength converting section 220, is substantially constant. FIG. 1 shows an example in which the indented portion 224 is formed as a partial circle with radius R centered on the point O in the direction changing section 230. The indented portion 224 may be formed by machining the end surface of the wavelength converting section via polishing, for example.

If the indented portion 224 is not formed and the end surface of the wavelength converting section 220 is flat, when the light from the direction changing section 230 is incident to this flat surface, the wavelength converting section 220 refracts the incident light. Here, the wavelength converting section 220 having a refractive index n causes the diffraction angle of the direction changing section 230 to be 1/n, and therefore when PPLN crystal with a refractive index of 2.2 is used as the wavelength converting section 220, for example, the diffraction angle is decreased to approximately 1/2.2. Accordingly, in this case, the direction changing section 230 sets the incident angle with respect to the wavelength converting section 220 to be n times the incident angle used when there is no refraction, in order to cause the input light to quasi-phase match the polarity inverting structure 222.

In contrast to this, the light source apparatus 100 that includes the indented portion 224 sets the angle at which the light from the direction changing section 230 is incident to the tangent of the indented portion 224 of the wavelength converting section 220 to always be perpendicular, regardless of the incident angle with respect to the polarity inverting structure 222. Accordingly, this light source apparatus 100 can allow the light incident to the wavelength converting section 220 to progress without being refracted, and can therefore cause the input light to quasi-phase match the polarity inverting structure 222 without increasing the incident angle with respect to the wavelength converting section 220 of the direction changing section 230.

As another example, the indented portion 224 may be formed as a recess whose cross section is a partial circle or ellipse that causes the distance from the point O at which the direction changing section 230 changes the direction of the input light to the position at which the input light reaches the polarity inverting structure 222 in a perpendicular direction to be the greatest distance among the distances from the point O to each position at which the input light reaches the polarity inverting structure 222 of the wavelength converting section 220. The wavelength converting section 220 having such a indented portion 224 changes the angle of refraction according to the angle at which the light from the direction changing section 230 is incident to the indented portion 224. The indented portion 224 refracts the light such that the absolute value of the incident angle to the polarity inverting structure 222 increases when the absolute value of the incident angle from the direction changing section 230 is greater.

In other words, the indented portion 224 has a function equivalent to the effect of a concave lens that increases the incident angle relative to the polarity inverting structure 222 for light incident in a direction shifted from the perpendicular direction, without refracting the light that is incident to the polarity inverting structure 222 in the perpendicular direction O-A'. As a result, the light source apparatus 100 can decrease the diffraction angle of the direction changing section 230, and can increase the degree of design freedom for the incident angle $\theta_{in}$ of the direction changing section 230 and the modulated frequency output by the driver section 130.

Figure 3:
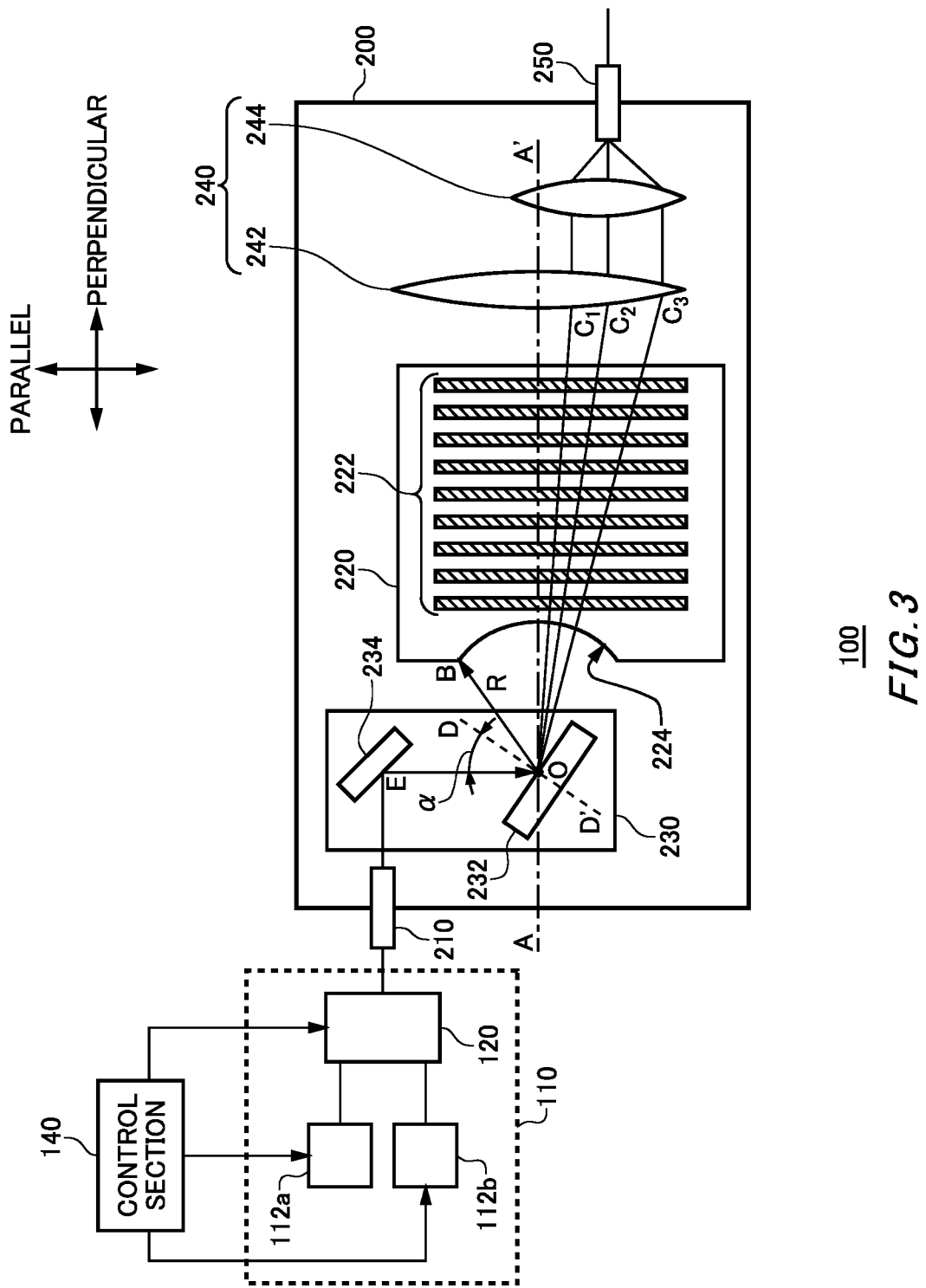
FIG. 3 shows a first modification of the light source apparatus 100 according to the present embodiment.

FIG. 3 shows a first modification of the light source apparatus 100 according to the present embodiment. In the light source apparatus 100 of the present modification, portions that have substantially the same operation as components in the light source apparatus 100 according to the present embodiment shown in FIG. 1 are given the same reference numerals and redundant descriptions are omitted. The direction changing section 230 of the present modification includes a diffraction grating 232 that diffracts the input light to change the progression direction. The direction changing section 230 may further include a mirror 234 that changes the progression direction of the input light to be a direction E-O for input to the diffraction grating 232.

The diffraction grating 232 may be fixed with a predetermined orientation. For example, when the input light is incident in a direction E-O at an angle α relative to the line D-O-D' that is perpendicular to the grating surface, the diffraction grating 232 changes the diffraction direction to be a direction O-$C_1$, O-$C_2$, or O-$C_3$, for example, according to the wavelength of the input light. The relationship between the diffraction angle β and the input light wavelength λ of the diffraction grating 232 is shown in the following Expression.

$$m\lambda = d(\sin \alpha \pm \sin \beta)$$ Expression 5

Here, m is an integer representing the order of the diffraction, and d represents the grating intervals in the diffraction grating 232. The present modification uses the diffraction grating 232 in which the grating interval d is fixed, as the direction changing section 230, and therefore the relationship between the diffraction angle β and the input light wavelength λ can be obtained by setting the incident angle α and the order m. Here, the diffraction angle indicates the angle DOC in FIG. 3.

Figure 4:
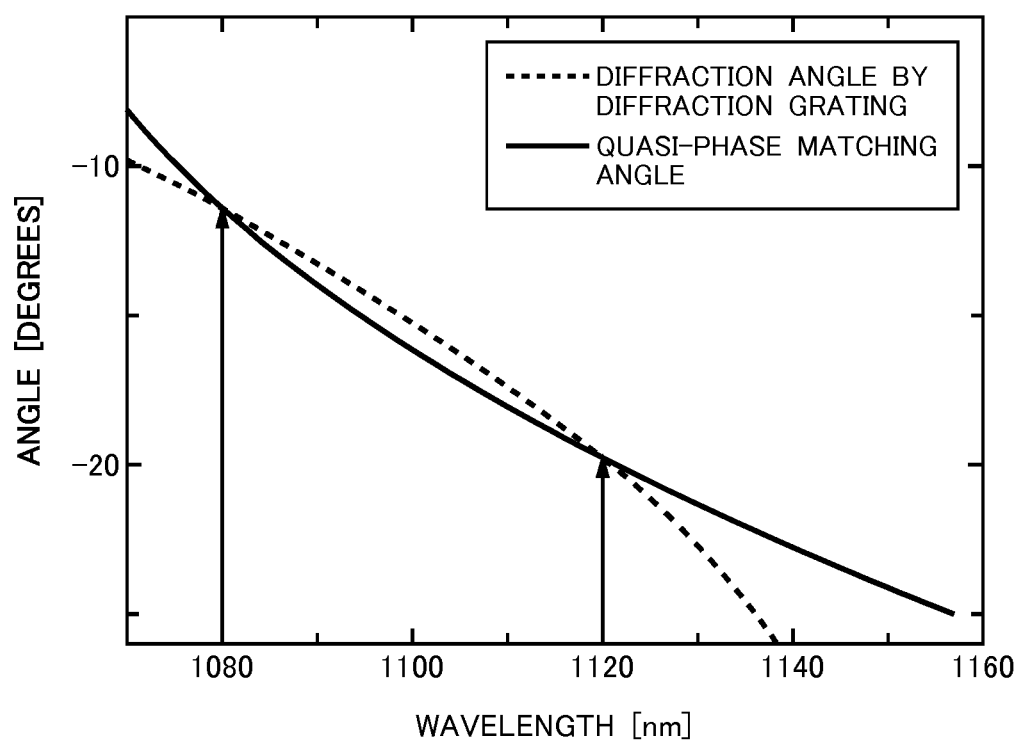
FIG. 4 shows exemplary input wavelength dependency characteristics for the diffraction angle of the diffraction grating 232 according to the present embodiment and for the incident angle when quasi-phase matching the wavelength converting section 220.

FIG. 4 shows exemplary input wavelength dependency characteristics for the diffraction angle of the diffraction grating 232 according to the present embodiment and for the incident angle when quasi-phase matching the wavelength converting section 220. In FIG. 4, the horizontal axis indicates the input light wavelength λ, and the vertical axis indicates the angle. Furthermore, the solid line indicates an exemplary incident angle achieving quasi-phase matching for a wavelength λ of the input light of the wavelength converting section 220, as calculated based on Expression 3. Yet further, the dotted line indicates the angle A'OC, from among the diffraction angles DOC relative to the input light wavelength λ of the diffraction grating 232, as calculated based on Expression 5. Here, for the incident angle and the diffraction angle in FIG. 4, the negative direction is considered to be on the angle A'$OC_1$ side from the direction A-A' that is perpendicular to the polarity inverting structure 222.

FIG. 4 shows results calculated under parameter conditions by which input light with a wavelength of 1080 nm and an incident angle of −11.4 degrees quasi-phase matches the wavelength converting section 220, and the diffraction angle of the diffraction grating 232 with respect to input light with a wavelength of 1080 nm is −11.4 degrees (e.g. d=0.8, α=25.88 degrees). Based on the results, it is understood that the light source apparatus 100 of the present modification can match the incident angle of the wavelength converting section 220 with the diffraction angle of the diffraction grating 232 for eat least two input light wavelengths.

In other words, in the example of FIG. 4, the diffraction angle of the diffraction grating 232 fixed with a predetermined orientation and the incident angle that achieves quasi-phase matching with the wavelength converting section 220 can be made the same for input light with a wavelength of 1080 nm and input light with a wavelength of 1120 nm. As a result, the light source apparatus 100 of the present modification may include a light source 112a that outputs light with a wavelength of 1080 nm and a light source 112b that outputs light with a wavelength of 1120 nm, for example, and may output light with a wavelength of 540 nm or 560 nm by converting the light from these light sources with the wavelength converting section 220.

The light source selecting section 120 may include one or more optical couplers, and may select two or more light sources for output. For example, the light source selecting section 120 may include a WDM coupler that combines light with a wavelength of 1080 nm and light with a wavelength of 1120 nm, and the light source apparatus 100 may output light with a wavelength of 540 nm and light with a wavelength of 560 nm by converting the light output from the two light sources with the wavelength converting section 220. In this way, the light source apparatus 100 can simultaneously generate two or more types of light. In this case, the control section 140 need not transmit a signal to the light source selecting section 120 for selecting a light source.

With the first modification of the light source apparatus 100 according to the present embodiment described above, a non-linear optical effect can be created without changing the relative positions of the input section 210 and the polarity inverting structure 222. Furthermore, the light source apparatus 100 of the present modification is an example in which the orientation of the diffraction grating 232 is fixed. Instead, the light source apparatus 100 may rotate the diffraction grating 232 on a rotational axis passing through the point O, thereby changing the incident angle of the wavelength converting section 220.

The light source apparatus 100 of the present modification is an example in which the diffraction grating 232 is used, but instead, the light source apparatus 100 may include a mirror that has a rotational axis passing through the point O and changes the incident angle of the wavelength converting section 220. In this way, by including a function for rotational operation, the light source apparatus 100 can create the non-linear optical effect by quasi-phase matching with a larger number of light sources outputting light with different wavelengths.

In the light source apparatus 100, the function for rotational operation may be realized by an MEMS (Micro Electro Mechanical Systems) actuator using technology for manufacturing a semiconductor integrated circuit. In this way, the light source apparatus 100 can stably move the optical components or the like.

Figure 5:
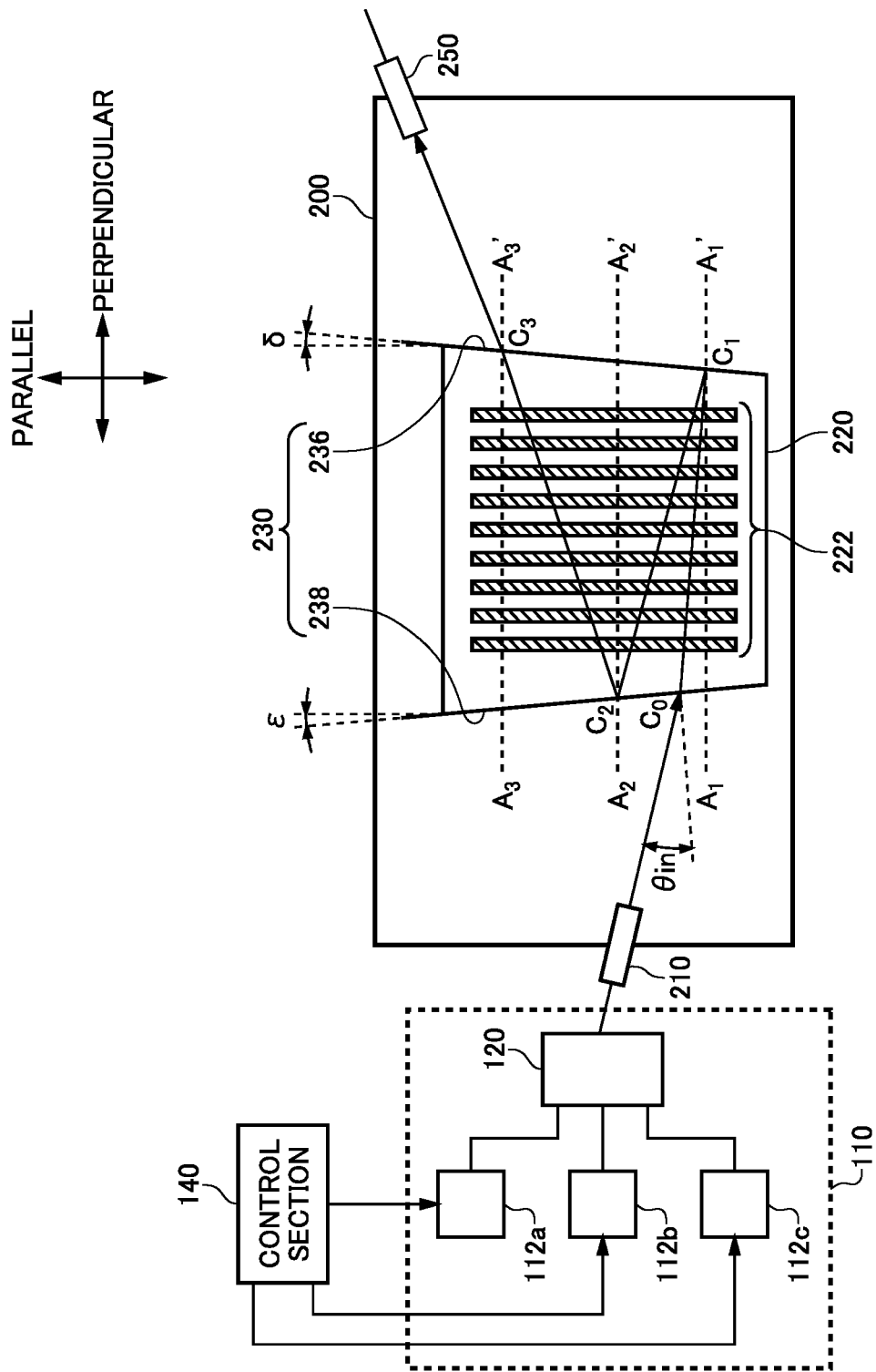
FIG. 5 shows a second modification of the light source apparatus 100 according to the present embodiment.

FIG. 5 shows a second modification of the light source apparatus 100 according to the present embodiment. In the light source apparatus 100 of the present modification, portions that have substantially the same operation as components in the light source apparatus 100 according to the present embodiment shown in FIG. 1 are given the same reference numerals and redundant descriptions are omitted. In FIG. 5, the lines An-An' (N=1, 2, 3) each indicate a line that is parallel to a direction perpendicular to the polarity inverting structure 222.

The direction changing section 230 of the present modification includes a reflective surface 236 that reflects light from the wavelength converting section 220, is at an angle from a plane parallel to the polarity inverting structure 222, and has a reflective film formed on at least a portion thereof to reflect the input light. In the direction changing section 230, when the light input to the wavelength converting section 220 reaches the reflective surface 236, the progression direction of this light is changed to be the direction of the light input surface 238 of the wavelength converting section 220.

In FIG. 5, the wavelength converting section 220 refracts the input light from the input section 210 at the point $C_0$, and causes the light to progress from the point $C_0$ to the point $C_1$. The reflective surface 236 of the direction changing section 230 reflects the input light at the point C1, thereby changing the progression direction of this light to be in the direction of the point C2. The reflective surface 236 is at an angle δ with respect to the direction parallel to the polarity inverting structure 222. As a result, the reflective surface 236 can set the incident angle of the input light with respect to the polarity inverting structure 222 to be the angle $C_0C_1A_1$ and the angle $C_1C_2A_2'$.

The light source apparatus 100 of the present modification includes a light source 112a with a wavelength that achieves pseudo-phase matching in accordance with the incident angle $C_0C_1A_1$ and a light source 112b with a wavelength that achieves pseudo-phase matching in accordance with the incident angle $C_1C_2A_2'$, and outputs light with a wavelength obtained by converting the light output from these light sources with the wavelength converting section 220. In this case, the light source apparatus 100 generates a second harmonic by causing quasi-phase matching with the polarity inverting structure 222 while the light output from the light source 112a progresses through a first optical path $C_0$-$C_1$, and reflects the second harmonic at the point $C_1$ so that the second harmonic passes through a second optical path $C_1$-$C_2$.

The polarity inversion period of the polarity inverting structure 222 does not quasi-phase match the generated second harmonic, and therefore the wavelength converting section 220 causes the second harmonic to pass through the second optical path $C_1$-$C_2$ without significant loss. Furthermore, the light source apparatus 100 causes the light output from the light source 112b to pass through the first optical path $C_0$-$C_1$ without significant loss, and generates a second harmonic by quasi-phase matching with the polarity inverting structure 222 while the passed light progresses through the second optical path $C_1$-$C_2$ after being reflected at the point $C_1$.

In this way, the light source apparatus 100 of the present modification includes a plurality of light sources 112 that each output light with a different wavelength, and can output light with a wavelength obtained by using the wavelength converting section 220 to convert the light output from each light source. Furthermore, in the present modification, by including an optical coupler in the light source selecting section 120, the light source apparatus 100 can output two types of light simultaneously. Here, the output section 250 may receive the light output from the point $C_2$ of the wavelength converting section 220 and output this light to the outside.

The direction changing section 230 of the present modification may further include a light input surface 238 of the wavelength converting section 220, which is at an angle from a plane parallel to the polarity inverting structure 222 and has a reflective film formed on at least a portion thereof to reflect the input light. In the direction changing section 230, when the light reflected by the reflective surface 236 reaches the input surface 238, the progression direction of this light is changed to be a direction toward the reflective surface 236.

In this case, the wavelength converting section 220 causes the input light to progress through the first optical path $C_0$-$C_1$, which is a path by which the input light reaches the reflective surface 236, the second optical path $C_1$-$C_2$, which is a path by which the light reflected by the reflective surface 236 reaches the input surface 238, and a third optical path $C_2$-$C_3$, which is a path by which the light reflected by the input surface 238 reaches the reflective surface 236. Furthermore, the wavelength converting section 220 causes the polarity inversion period for the progression direction of one of the first, second, and third optical paths to be a predetermined period corresponding to the input light.

In other words, in the example of FIG. 5, the input surface 238 of the wavelength converting section 220 reflects the light progressing from the point $C_1$ to the point $C_2$, at the point $C_2$, thereby changing the progression direction to be a direction toward the point $C_3$. The input surface 238 has a reflective film formed thereon and is at an angle $\epsilon$ with respect to a direction parallel to the polarity inverting structure 222. As a result, the input surface 238 can cause the incident angle of the input light with respect to the polarity inverting structure 222 to be the angle $C_2C_3A_3$.

The light source apparatus 100 of the present modification further includes a light source 112c with a wavelength that achieves pseudo-phase matching in accordance with the incident angle $C_2C_3A_3$, and outputs light with a wavelength obtained by converting the light output from this light source with the wavelength converting section 220. In this case, the light source apparatus 100 generates a second harmonic by causing quasi-phase matching with the polarity inverting structure 222 while the light output from the light source 112c progresses through the third optical path $C_2$-$C_3$. The reflective film is not formed on at least the point $C_3$ of the reflective surface 236. Furthermore, the output section 250 may receive the light output from the point $C_3$ of the wavelength converting section 220 and output this light to the outside.

With $n_1$ representing the refractive index of the wavelength converting section 220 and $\gamma$ representing the angle $C_0C_1A_1$, the following Expression can be formed.

$$\gamma + \varepsilon = \sin^{-1}\left(\frac{\sin(\theta_{in})}{n_1}\right) \quad \text{Expression 6}$$

Furthermore, the angle $C_1C_2A_2'$ becomes $2\delta+\gamma$ and the angle $C_2C_3A_3$ becomes $2\epsilon+2\delta+\gamma$. Accordingly, the light source apparatus 100 can achieve quasi-phase matching between a predetermined light wavelength and the polarity inverting structure 222 based on the refractive index $n_1$ of the wavelength converting section 220, the incident angle $\theta_{in}$, and the angles $\delta$ and $\epsilon$ of the reflective surface 236 and the input surface 238 with respect to a direction parallel to the polarity inverting structure 222.

For example, with a wavelength converting section 220 that uses PPLN with a refractive index of 2.15, by setting the incident angle $\theta_{in}$ to be 1.83 degrees, $\epsilon$ to be 4.15 degrees, and $\delta$ to be 3.2 degrees, the angle $C_0C_1A_1$ can be made 5 degrees, the angle $C_1C_2A_2'$ can be made 11.4 degrees, and the angle $C_2C_3A_3$ can be made 19.7 degrees. As a result, the light source apparatus 100 can output the second harmonics of a plurality of light sources having respective wavelengths of 1064 nm, 1080 nm, and 1120 nm. In the present modification, the angles are described using absolute values.

Based on the above, the light source apparatus 100 of the present modification includes a plurality of light sources 112 that each output light with a different wavelength, and can output light with a wavelength obtained by using the wavelength converting section 220 to convert the light output from each light source. Furthermore, in the present modification, by including one or more optical couplers in the light source selecting section 120, the light source apparatus 100 can output two or more types of light simultaneously.

The light source apparatus 100 of the present embodiment described above is an example in which the wavelength converting section 220 generates a second harmonics, but instead, the wavelength converting section 220 may create another non-linear optical effect such as sum frequency waves, differential waves, optical parametric oscillation, optical parametric amplification, or optical parametric generation. Furthermore, the light source apparatus 100 of the present embodiment described above is an example in which the light source apparatus 100 includes the wavelength conversion apparatus 200, but instead, the wavelength conversion apparatus 200 may be used as an independent apparatus.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A wavelength conversion apparatus comprising:
an input section into which input light is input;
a wavelength converting section that includes a polarity inverting structure whose polarity inverts periodically and that, in response to the input of light having a wavelength corresponding to the period with which the polarity inverts, converts the wavelength of the light; and
a direction changing section that changes a progression direction in which the input light passes through the polarity inverting structure, according to the wavelength of the input light, without changing relative positions of the input section and the polarity inverting structure;
wherein the wavelength converting section further includes an indented portion that is a recess formed within a surface into which light is input and that causes distance from a point at which the direction changing section changes the direction of the input light to a point at which the input light reaches the wavelength converting section to be substantially constant.

2. The wavelength conversion apparatus according to claim 1, wherein
the direction changing section changes an incident angle at which the input light is incident to the polarity inverting structure, according to the wavelength of the input light, and sets the period with which the polarity of the polarity inverting structure inverts relative to the progression direction of the input light to be a period with which the wavelength of the input light corresponding to the incident angle is converted.

3. The wavelength conversion apparatus according to claim 1, wherein
the indented portion is formed as a recess with a cross section that is a partial circle or ellipse, and causes a distance from the point at which the direction changing section changes the direction of the input light to the position at which the input light reaches the polarity inverting structure in a perpendicular direction to be the greatest distance among distances from the point at which the direction changing section changes the direction of the input light to each position at which the input light reaches the polarity inverting structure of the wavelength converting section.

4. The wavelength conversion apparatus according to claim 1, wherein
the polarity inverting structure has a polarity inversion period for converting the wavelength of each of a plurality of input lights, in response to the direction changing section changing the propagation direction of the input light to have an incident angle that does not result in the input light being perpendicular to the polarity inverting structure.

5. The wavelength conversion apparatus according to claim 1, wherein
the wavelength converting section outputs light with a wavelength that is ½ of the wavelength of the light input thereto.

6. The wavelength conversion apparatus according to claim 1, wherein
the wavelength converting section outputs light with a frequency that is equal to a sum of or a difference between frequencies of two lights input thereto.

7. The wavelength conversion apparatus according to claim 1, further comprising:
a light source section that outputs light with a plurality of wavelengths,
wherein the wavelength conversion apparatus receives the light output from the light source section, converts the wavelength of the light, and outputs the resulting light.

8. The wavelength conversion apparatus according to claim 7, wherein the light source section includes:
a plurality of light sources that each output light with a different wavelength; and
a light source selecting section that has one or more optical switches and selects one light source from among the plurality of light sources to output light.

9. The wavelength conversion apparatus according to claim 8, wherein
the light source selecting section includes one or more optical couplers, and selects two or more light sources to output light.

10. A wavelength conversion method comprising:
inputting light from an input section;
providing a polarity inverting structure whose polarity inverts periodically and, in response to the input of light having a wavelength corresponding to the period with which the polarity inverts, converting the wavelength of the light; and
changing a progression direction in which the input light passes through the polarity inverting structure, according to the wavelength of the input light, without changing relative positions of the input section and the polarity inverting structure;
wherein the polarity inverting structure comprises an indented portion that is a recess formed within a surface into which light is input causing the distance from a point at which the progression direction of the input light is changed to a point at which the input light reaches the polarity inverting structure to be substantially constant.

11. A wavelength conversion apparatus comprising:
an input section into which input light is input;
a wavelength converting section that includes a polarity inverting structure whose polarity inverts periodically and that, in response to the input of light having a wavelength corresponding to the period with which the polarity inverts, converts the wavelength of the light; and
a direction changing section that changes a progression direction in which the input light passes through the polarity inverting structure, according to the wavelength of the input light, without changing relative positions of the input section and the polarity inverting structure, the direction changing section including a reflective surface for light of the wavelength converting section that is at an angle relative to a plane parallel to the polarity inverting structure and that has a reflective film that reflects input light formed on at least a portion thereof, and when the light input to the wavelength converting section reaches the reflective surface, the direction changing section changes the progression direction of the light to be a direction toward an input surface for light of the wavelength converting section.

12. The wavelength conversion apparatus according to claim 11, wherein
the direction changing section further includes the input surface for light of the wavelength converting section that is at an angle relative to a plane parallel to the polarity inverting structure and that has a reflective film that reflects input light formed on at least a portion thereof;
wherein when the light reflected by the reflective surface reaches the input surface, the direction changing section changes the progression direction of the light to be a direction toward the reflective surface of the wavelength converting section;
wherein the wavelength converting section causes the input light to progress through a first optical path, which is a path by which the input light reaches the reflective surface, a second optical path, which is a path by which the light reflected by the reflective surface reaches the input surface, and a third optical path, which is a path by which the light reflected by the input surface reaches the reflective surface; and
wherein the wavelength converting section sets the polarity inversion period for the progression direction of one of the first, second, and third optical paths to be a predetermined period corresponding to the input light.

13. The wavelength conversion apparatus according to claim 11, wherein
the direction changing section changes an incident angle at which the input light is incident to the polarity inverting structure, according to the wavelength of the input light, and sets the period with which the polarity of the polarity inverting structure inverts relative to the progression direction of the input light to be a period with which the wavelength of the input light corresponding to the incident angle is converted.

14. The wavelength conversion apparatus according to claim 11, wherein
the polarity inverting structure has a polarity inversion period for converting the wavelength of each of a plurality of input lights, in response to the direction changing section changing the propagation direction of the input light to have an incident angle that does not result in the input light being perpendicular to the polarity inverting structure.

15. The wavelength conversion apparatus according to claim 11, wherein
the wavelength converting section outputs light with a wavelength that is ½ of the wavelength of the light input thereto.

16. The wavelength conversion apparatus according to claim 11, wherein the wavelength converting section outputs light with a frequency that is equal to a sum of or a difference between frequencies of two lights input thereto.

17. The wavelength conversion apparatus according to claim 11 further comprising:
a light source section that outputs light with a plurality of wavelengths,
wherein the wavelength conversion apparatus receives the light output from the light source section, converts the wavelength of the light, and outputs the resulting light.

18. The wavelength conversion apparatus according to claim 17, wherein the light source section includes:
a plurality of light sources that each output light with a different wavelength; and
a light source selecting section that has one or more optical switches and selects one light source from among the plurality of light sources to output light.

19. The wavelength conversion apparatus according to claim 18, wherein
the light source selecting section includes one or more optical couplers, and selects two or more light sources to output light.

20. A wavelength conversion method comprising:
inputting light from an input section;
providing a polarity inverting structure whose polarity inverts periodically and, in response to the input of light having a wavelength corresponding to the period with which the polarity inverts, converting the wavelength of the light; and
changing a progression direction in which the input light passes through the polarity inverting structure, according to the wavelength of the input light, without changing relative positions of the input section and the polarity inverting structure;
wherein the progression direction is changed by providing an input surface for light of the polarity inverting structure and a reflective surface for light of the polarity inverting structure, each surface being provided at angles relative to a plane parallel to the polarity inverting structure, and each surface having a reflective film that reflects input light formed on at least a portion thereof, such that:
when the light input to the wavelength converting section reaches the reflective surface, the progression direction of the light is changed to be a direction toward the input surface for light of the wavelength converting section, and
when the light, the progression direction of which is changed by the reflective surface, reaches the input surface, the progression direction of the light is changed to be a direction toward the reflective surface,
the input light thereby being caused to progress through a first optical path, which is a path by which the input light reaches the reflective surface, a second optical path, which is a path by which the light reflected by the reflective surface reaches the input surface, and a third optical path, which is a path by which the light reflected by the input surface reaches the reflective surface, wherein the wavelength converting section sets the polarity inversion period for the progression direction of one of the first, second, and third optical paths to be a predetermined period corresponding to the input light.

* * * * *